United States Patent
Koo et al.

(10) Patent No.: US 9,862,639 B2
(45) Date of Patent: Jan. 9, 2018

(54) METHOD FOR PROCESSING TOUCH WINDOW GLASS FOR PORTABLE TERMINAL

(71) Applicant: 61C&S Co., Ltd., Seoul-si (KR)

(72) Inventors: Ja-Ock Koo, Yongin-si (KR); Yeong-Seob Yun, Yongin-si (KR); Chun Mi Kim, Anseong-si (KR)

(73) Assignee: 61C&S CO., LTD., Seoul-si (KR)

( * ) Notice: Subject to any disclaimer, the term of this patent is extended or adjusted under 35 U.S.C. 154(b) by 30 days.

(21) Appl. No.: 14/959,527

(22) Filed: Dec. 4, 2015

(65) Prior Publication Data
US 2017/0050875 A1 Feb. 23, 2017

(30) Foreign Application Priority Data
Aug. 17, 2015 (KR) .................. 10-2015-0115509

(51) Int. Cl.
*C03B 23/03* (2006.01)
*C03C 17/22* (2006.01)
*C03B 23/025* (2006.01)

(52) U.S. Cl.
CPC .......... *C03C 17/22* (2013.01); *C03B 23/0256* (2013.01); *C03C 2218/119* (2013.01)

(58) Field of Classification Search
CPC ....... C03B 13/08; C03B 23/02; C03B 23/002; C03B 23/0256; C03B 23/0305
USPC ........................................ 65/60.1
See application file for complete search history.

(56) References Cited

U.S. PATENT DOCUMENTS

| 5,178,659 A * | 1/1993 | Watanabe ........... C03B 23/0235 65/106 |
| 2012/0114901 A1* | 5/2012 | Uraji ......................... B32B 1/00 428/121 |
| 2013/0176484 A1* | 7/2013 | Pilliod ................... G03B 15/05 348/373 |
| 2013/0337224 A1* | 12/2013 | Odani ................... G06F 1/1626 428/130 |

FOREIGN PATENT DOCUMENTS

| KR | 10-2012-0000362 A | 1/2012 | |
| KR | 10-2013-0043374 A | 4/2013 | |
| KR | 10-1449363 B1 | 10/2014 | |
| KR | 10-1449365 B1 | 10/2014 | |
| WO | WO 2012030751 A2 * | 3/2012 | ......... C03B 23/0256 |

\* cited by examiner

*Primary Examiner* — Cynthia Szewczyk
(74) *Attorney, Agent, or Firm* — Hauptman Ham, LLP

(57) ABSTRACT

A method of manufacturing curved touch window glass for a portable terminal, includes a plane glass processing process for processing plane glass to have a size capable of being changed to a predetermined size of completed curved glass, a printing process for printing a specific pattern on a back surface of the plane glass using ceramic ink, and a curved glass forming process for forming the curved glass in a high temperature atmosphere in such a manner that a curved surface is formed in at least one part of the plane glass having the printed pattern using an upper mold and a lower mold. The size of the plane glass on a plane which is processed in the plane glass processing process is shorter than a size measured along the curved surface of the completed curved glass, and the ceramic ink includes heat-resistant ink capable of withstanding a high temperature in the curved glass forming process.

3 Claims, 3 Drawing Sheets

METHOD FOR PROCESSING TOUCH WINDOW GLASS FOR PORTABLE TERMINAL

REFERENCE TO RELATED APPLICATIONS

This application claims the priority benefit of Korean Patent Application No. 10-2015-0115509 filed on Aug. 17, 2015, the entire contents of which are incorporated herein by reference.

FIELD OF THE INVENTION

The present invention relates to a method for processing touch window glass for a portable terminal, such as a smart phone, and, more particularly, to a method for processing touch window glass, which is efficient in curved glass having specific curvature, is capable of precise printing, and has a specific curve.

BACKGROUND OF THE INVENTION

A portable terminal, such as a smart phone, may be said to be one of the most important personal devices due to its extensible functionality. Touch window glass is installed on the front surface of the terminal. In general, such touch window glass has a plane (two dimensions) shape. Recently, a variety of types of functions are assigned to a smart phone, and a smart phone including touch window glass in part of which a curved surface has been formed in order to increase the satisfaction of the functions is released.

In a current portable terminal having curved glass, at least one part of glass may be formed into a curved surface with respect to a single axis. Glass at least one part of which has been formed into a curved surface on the basis of a single axis as described above is called curved glass or 3D glass. Such 3D glass is fabricated in a high temperature atmosphere. For example, glass of a flat panel shape is put between an upper mold and a lower mold including a cavity having a curved surface shape corresponding to the curved surface shape of touch window glass and is then exposed to a high temperature atmosphere of 700° C. or more, for example, thereby forming 3D touch window glass having the curved surface shape corresponding to the cavity between the upper and lower molds.

Furthermore, the back of curved glass installed on the front surface of a smart phone includes a touch pad part for implementing a touch pad function for detecting a touched point based on a change of a current value or the detection of contact pressure. Such a touch pad function part may include, for example, an ITO deposition layer and a silver paste layer for electrically connecting the ITO deposition layer and a printed circuit board (PCB).

Touch window glass is basically transparent, but printing having a predetermined shape is performed on the back of the touch window glass so that an electronic part installed on the back of the touch window glass is not exposed at the front. In this case, in the aforementioned 2D glass, printing may be performed relatively simply because it is performed on a plane. However, it is not easy to form a printing layer on recent 3D glass from the view point of the stereoscopic structure of 3D glass.

A conventional printing process is described below. As shown in FIG. 1, after 2D glass, that is, plane glass, is processed as step S10, the plane glass is processed into 3D glass, that is, curved glass at step S14. Furthermore, printing having a specific pattern is performed on one side of the 3D glass processed to have a curved surface. However, there are many difficulties in printing the 3D glass having the curved surface. Furthermore, the specific pattern is printed on one side of the curved glass using a commercialized technology, for example, a printing apparatus having a complicated structure.

Furthermore, in a technology disclosed in Korean Patent No. 10-1449363 issued to the present applicant, 3D-processed glass is planarized using a specific force (suction force) and then printed. In this case, since printing is performed on glass after 3D processing is performed on the glass, there is a difficulty in that a specific apparatus is required to make curved glass a flat panel.

Furthermore, in the Korean Patent, printing is performed after touch window glass has been processed into 3D glass. Furthermore, in all conventional technologies, printing is performed on touch window glass for a portable terminal after a glass forming process performed in a high temperature atmosphere is completed and the formed glass is cooled at room temperature. Printing is performed after 3D glass for a smart phone or a portable terminal is fully formed as described above because the 3D glass is formed in a high temperature atmosphere. The reason for this is that a printed portion is changed if printing is first performed and the printed plane (2D) glass is then processed in a high temperature atmosphere.

SUMMARY OF THE INVENTION

Accordingly, the present invention has been made keeping in mind the above problems occurring in the prior art, and an object of the present invention is to provide curved glass for a portable terminal, which does not require a separate apparatus for printing curved glass and which is efficiently printed.

In accordance with such an object of the present invention, curved glass for a portable terminal can be produced most economically because a conventional apparatus for plane printing can be used and separate 3D printing equipment is not required.

In accordance with an embodiment of the present invention, there is provided a method of manufacturing curved touch window glass for a portable terminal, wherein at least one part of the curved touch window glass comprises a curved surface portion. The method includes a plane glass processing process for processing plane glass to have a size capable of being changed to a predetermined size of completed curved glass, a printing process for printing a specific pattern on the back surface of the plane glass using ceramic ink, and a curved glass forming process for forming the curved glass in a high temperature atmosphere in such a manner that a curved surface is formed in at least one part of the plane glass having the printed pattern using an upper mold and a lower mold. In this case, the size of the plane glass on a plane which is processed in the plane glass processing process is shorter than a size measured along the curved surface of the completed curved glass. The ceramic ink includes heat-resistant ink capable of withstanding a high temperature in the curved glass forming process.

In accordance with an embodiment of the present invention, the plane glass processing process includes a process for forming a part mounting hole in the curved surface portion. The size of the part mounting hole in the plane state of the glass is smaller than the size measured along the curved surface of the completed curved glass.

In accordance with another embodiment of the present invention, in the printing process, the printing is performed on the remaining portion other than a non-printing portion in which a portion having the lens of an embedded camera mounted thereon is not printed. In this case, the size of the non-printing portion in the plane state of the glass is smaller than the size of the non-printing portion of the curved glass which is measured along the curved surface of the completed curved glass.

In accordance with another embodiment of the present invention, in the curved glass forming process, part of the plane glass is formed into the curved surface by weight of a weight body coming into contact with one side of the plane glass in the state in which the plane glass has been supported by the upper mold and the lower mold. In such an embodiment, the upper mold, the lower mold, and the weight body may come into point or line contact with the glass.

DETAILED DESCRIPTION OF THE INVENTION

Hereinafter, embodiments of the present invention are described in detail with reference to the accompanying drawings.

Figure 1:
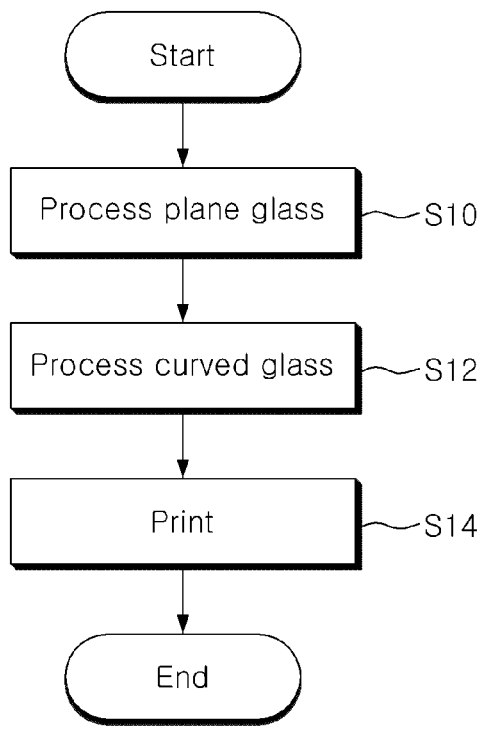
FIG. 1 is a flowchart illustrating a conventional printing process.
Figure 2:
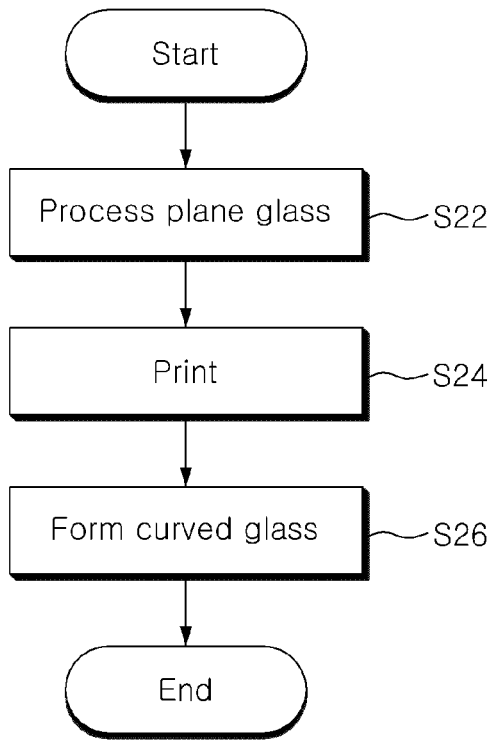
FIG. 2 is a flowchart schematically illustrating a printing process according to an embodiment of the present invention.

As shown in FIG. 2, in a method for processing glass for a terminal according to an embodiment of the present invention, a process for processing plane glass (2D glass) is first started at step S22. In this case, the processing of the plane glass means completing the plane glass having a size corresponding to a final product having predetermined specifications.

Accordingly, at step S22, horizontal and vertical sizes corresponding to an external appearance may be determined, glass may be cut, and a speaker mounting hole 32 for transferring a sound, generated from a speaker disposed within a terminal, to the front may be formed. In this case, the final size of curved glass (3D glass) has already been determined. That is, the size of an actual product has been determined based on a 3D shape because touch window glass for a smart phone to be handled according to an embodiment of the present invention is 3D glass whose at least one side has a curved surface portion.

Figure 3A:
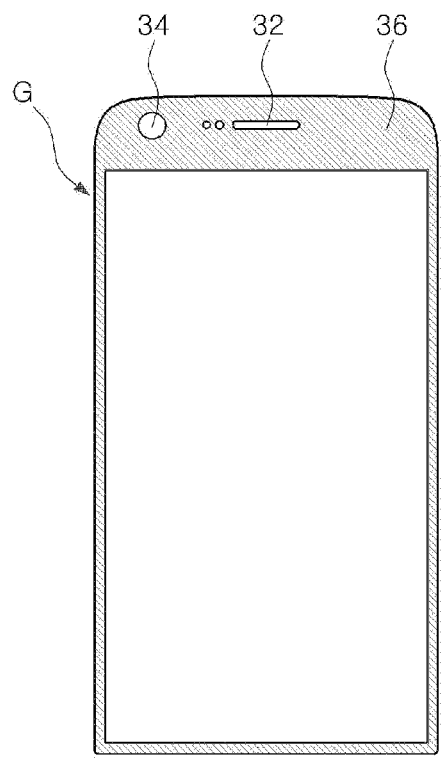
FIGS. 3A and 3B show an exemplary diagram of curved glass according to an embodiment of the present invention.

Furthermore, the speaker mounting hole may be formed in the plane glass in the plane state at step S22. It is to be noted that the size of the speaker mounting hole is greatly changed if the plane glass is processed into the 3D glass after the speaker mounting hole is formed in the plane glass in the 2D state. In other words, if the speaker mounting hole 32 is formed in the plane glass as in the size of the final product (curved glass) in the curved surface state, the size of the speaker mounting hole 32 becomes greater than the original size because glass is deformed in the process of being formed into a curved surface. For reference, FIG. 3 illustrates the final product (curved glass).

Accordingly, the size of the speaker mounting hole 32 in the curved surface of final curved glass may be measured. The size of the speaker mounting hole 32 in the plane glass may be calculated by taking into consideration a relationship with curvature based on the measured size. The speaker mounting hole 32 may be formed based on the calculated size. In this specification, the size means a size in the direction including a curved surface. For example, if a curved surface is formed at the end in a vertical direction as in FIG. 3, the size means a size in the vertical direction of the speaker mounting hole 32.

In general, if the size of the speaker mounting hole formed in the plane glass is A after processing, the size of the speaker mounting hole 32 becomes "A+$\alpha$" after the plane glass is formed into the curved glass in a process for forming a curved surface. Accordingly, at step S22, the size of the speaker mounting hole may be set by taking into consideration a size changed in the process for forming a curved surface.

For example, the curved surface distance of curved glass including a curved surface may be easily calculated using a CAD program, that is, a design program. Furthermore, the size of the speaker mounting hole has to be set to have a precise size after the speaker mounting hole becomes a curved surface state by taking into consideration curvature of 3D glass because the size of the speaker mounting hole changed from the plane to the curved surface is different depending on curvature. That is, the size of the speaker mounting hole formed from glass of a plan shape may be smaller than a size designed (or predetermined) in the curved surface shape.

In general, a plurality of holes is formed in glass that forms the front surface of a terminal. For example, the plurality of holes may include a speaker mounting hole on which a speaker is mounted and a home key mounting hole for enabling a user to press a kind of button called a home key. Accordingly, although the speaker mounting hole has been illustrated, the speaker mounting hole may also be called a part mounting hole, that is, a hole to be formed in the curved glass in the following description.

As described above, the process for forming the glass in the plane state includes a process for forming the part mounting hole formed in the curved surface portion of completed 3D glass. Furthermore, the size of the part mounting hole in the glass of the plane state may be set to be smaller than a size measured along the curved surface of the completed curved glass.

As described above, when the curved glass is fabricated, the size of the part mounting hole 32 has been illustrated as being changed. However, those skilled in the art may understand that a size (length) in the vertical direction (direction including the curved surface) of glass is also changed. Since the length of glass in the direction including the curved surface is changed, the size of the part mounting hole 32 within a range in which the curved surface is formed may be changed.

Since the size of glass itself in the direction in which the curved surface has been formed is further increased as described above, the size of glass processed in the plane may be set to be shorter than a size measured along the curved surface of completed curved glass. In this case, if the glass is processed using a mold so that it has an actual curved surface shape, there is a more difference in size than expected. For example, when the end of glass having a size of 123.54 mm in the vertical direction (e.g., the direction in which a curved surface is partially formed) is processed to have a curved surface, if the radius of curvature is set to 20 mm, there is a change in the length of about 6 mm.

The plane glass completed through step S22 as described above is plane glass including the size of the part mounting hole 32 into which a change has been taken into consideration, a size in the vertical direction (regarding glass including a curved surface at the top in the vertical direction in the present embodiment), and the size in a predetermined horizontal direction. After the plane glass is processed as described above at step S22, a printing process is performed at step S24.

That is, an embodiment of the present invention may be expected to have an advantage in which a complicated and expensive printing apparatus for printing 3D glass is not required because the printing of the 3D glass (curved glass) can be performed in the plane state. Accordingly, in the printing process at step S24, printing may be performed using a 2D printing apparatus which is widely commercialized. For example, the 3D glass may be printed using a silk screen printing method.

In this case, a high temperature atmosphere in which a subsequent curved glass forming process at step S26 is performed may be taken into consideration in the printing process. That is, step S26 is a process for forming the plane glass into the curved glass. This process is performed in a high temperature atmosphere in which glass can be deformed. Accordingly, a portion printed in the printing process should not be damaged or changed in a high temperature environment.

That is, in the curved glass forming process step S26 performed after the printing process, in order to prevent a printed portion from being damaged by a high temperature, heat-resistant ink, such as ceramic ink, may be used. Furthermore, the following points should be noted because a printing layer 36 (refer to FIG. 3B) printed in the printing process is changed. That is, the ink, such as ceramic ink, printed on the back of glass according to an embodiment of the present invention, should not be deformed in a high temperature atmosphere, such as that described later, in the curved glass forming process because the ink has a heat-resistant property.

Furthermore, in FIG. 3, 34 refers to a non-printing portion, that is, a portion in which the lens of a camera embedded in a terminal is installed. The non-printing portion 34 may have a transparent glass state in which printing has not been performed because photographing using the camera is impossible if printing is performed on the non-printing portion 34. Furthermore, the non-printing portion 34 for a camera may have a circle by taking into consideration a circular lens.

In contrast, in the printing process at step S24, the printing layer 36 is formed by performing printing on the back surface of the plane glass. Accordingly, the non-printing portion 34 may not be printed in circle at step S24, that is, prior to the process of forming the curved glass. That is, the periphery of the non-printing portion 34 may be printed so that the non-printing portion 34 forms a complete circle after the curved surface is formed in the curved glass forming process at step S26.

To this end, at step S24, the printing may be performed on the plane glass in the state in which the non-printing portion 34 forming an oval having a short axis in the direction in which the curved surface is formed is left by considering that a size is increased in the axial direction in which the curved surface is formed in a subsequent process. If printing is performed on the plane glass as described above, the non-printing portion 34 remains intact so that it becomes a circle after the subsequent curved glass forming process at step S26. That is, in the printing process according to an embodiment of the present invention, printing is performed on the plane glass other than the non-printing portion 34 in which a portion having the lens of an embedded camera mounted thereon is not printed. In this case, the size of the non-printing portion 34 in the plane state of glass may be set to be shorter than the size of the non-printing portion 34 of the curved glass which is measured along the curved surface of the completed curved glass.

Step S22 and step S24 described above are summarized below. The plane glass processing process includes the process of forming the part mounting hole 30 formed in the curved surface portion. In this case, the process for forming the part mounting hole includes forming a size different from the actual size of the curved surface portion of curved glass by taking into consideration a shape to be changed in the curved glass forming process.

Furthermore, in the printing process, the printing is performed on the remaining portion other than the non-printing portion 34 in which a portion having the lens of an embedded camera mounted thereon is not printed. The non-printing portion 34 may have a size different from the actual size of the curved surface portion of the curved glass by taking into consideration a shape to be changed in the curved glass forming process.

Furthermore, after printing is performed as described above, the curved glass forming process for changing at least one part of glass into the curved surface shape is performed at step S26. The curved glass forming process may be performed in various ways. For example, plane glass on which printing has been completed may be formed to have a required curved surface between the upper mold and the lower mold in a high temperature atmosphere. The plane glass on which printing has been completed may be formed into the curved glass including a curved surface portion using the upper mold and the lower mold in accordance with a conventional method.

In this case, the curved surface of at least one part of glass is formed in a high temperature atmosphere in which the glass can be deformed. Furthermore, the printing layer 36 should not be changed or damaged by a high temperature because the printing layer 36 has already been formed in glass in the process prior to the curved glass forming process.

Accordingly, in the curved glass forming process, a contact between the printing layer 36 and an external member or device should be prevented to a maximum extent. An embodiment in which the curved glass is formed as described above is described below with reference to FIG. 4.

Figure 4:
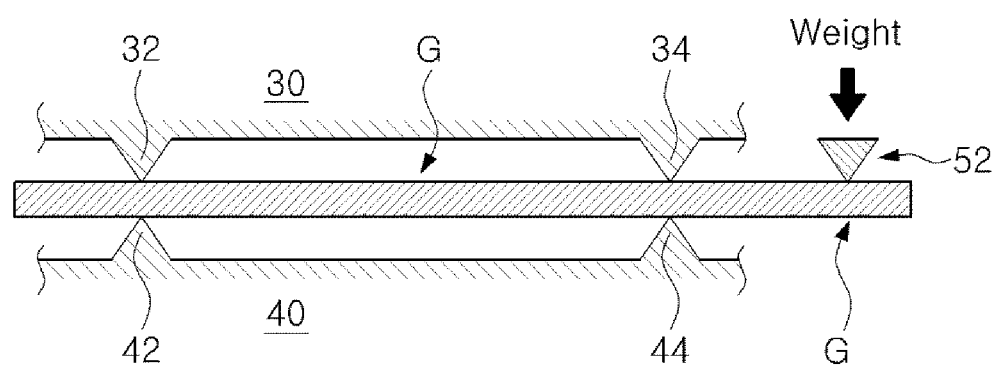
FIG. 4 is an exemplary diagram of a process for forming curved glass according to an embodiment of the present invention the curved glass.

As shown in FIG. 4, the touch window glass G is supported by the support portions 32 and 34 of an upper mold 30 and the support portions 42 and 44 of a lower mold 40. The support portions 32 and 34 of the upper mold 30 and the support portions 42 and 44 of the lower mold 40 may be configured to come into point contact with the touch window glass G in order to minimize a contact area. To support the touch window glass G through a single line contact rather than a plurality of point contacts may be further advantageous from the view point of the manufacture and economy of a mold.

Accordingly, the support portions 32 and 34 of the upper mold 30 may be formed in straight line-shaped protrusions and configured to come into line contact with the touch window glass G. Furthermore, the support portions 42 and 44 of the lower mold 40 may also be formed in straight line-shaped protrusions and configured to come into line contact with the touch window glass G. Furthermore, the touch window glass G supported by the support portions between the upper mold 30 and the lower mold 40 experience a force according to a specific weight body 52 at the end of a portion in which a curved surface is to be formed.

Figure 3B:
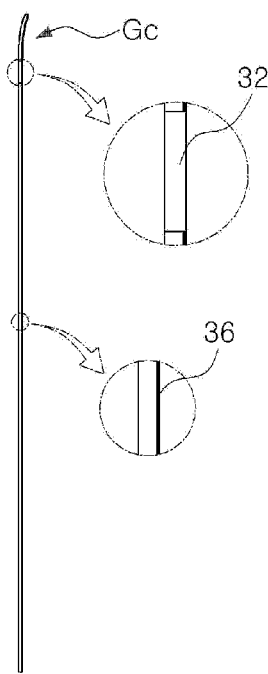

When the linear protruded portion of the weight body 52 comes into line contact with the touch window glass G, the weight body 52 pressurizes a specific force to the touch window glass G. Furthermore, the upper mold 30 and the lower mold 40 are installed in a specific high temperature chamber and experience a high temperature environment in which the touch window glass G can be deformed at step S26. Accordingly, when the weight body 52 pressurizes one end of the touch window glass G, the end of the touch window glass G on one side thereof is formed into a curved surface portion Gc, as shown in FIG. 3(b).

In the illustrated embodiment, the touch window glass G may correspond to an embodiment in which part of the touch window glass G on one side thereof includes the curved surface portion Gc. Furthermore, the curved surface portion Gc may be formed in a plurality of portions in a terminal. For example, the curved surface portion Gc having a top portion and a bottom portion symmetrical to each other may be formed. In some embodiments, as in the aforementioned touch window glass G, the entire terminal may be configured to have a specific curved surface shape. Furthermore, the degree of the curved surface of the end of the curved surface portion Gc of the touch window glass G may be determined by a contact between the lower mold 40 and the touch window glass G deformed by the weight body 52.

In accordance with the manufacturing method according to an embodiment of the present invention, there may be an advantage in which 3D glass can be manufactured very conveniently, effectively, and economically because printing is performed in the 2D state in the process of manufacturing the 3D glass. Such a point may have the same meaning as that touch window glass for a portable terminal can be manufactured most economically.

Furthermore, an embodiment of the present invention may have an advantage in which reliability of completed curved glass can be secured to a maximum extent because a hole (i.e., the part mounting hole) formed in the curved surface portion of 3D glass and the non-printing portion (i.e., a portion corresponding to a circular lens) can be accurately designed.

Furthermore, in accordance with an embodiment of the present invention, an influence on printed ink in a high temperature atmosphere can be minimized because all portions come into point or line contact with 3D glass and thus a portion coming into point or line contact with the 3D glass is minimized. Accordingly, there may be an advantage in which maximum reliability of a completed product can be secured.

As described above, in accordance with an embodiment of the present invention, after printing is completed in the plane glass state, at least one part of 3D glass becomes a curved surface. Furthermore, it is evident that those skilled in the art will understand that the present invention may be modified in other various ways without departing from the scope of the present invention and the scope of the present invention should be interpreted based on the appended claims.

What is claimed is:

1. A method of manufacturing curved touch window glass for a portable terminal, wherein at least one part of the curved touch window glass comprises a curved surface portion, the method comprising:
   a plane glass processing process of
      processing plane glass to have a size capable of being changed to a predetermined size of the curved touch window glass, and
      forming a part mounting hole with a predetermined size in a first portion of the plane glass;
   a printing process of printing a specific pattern on a back surface of the plane glass using ceramic ink; and
   a curved glass forming process of forming the curved touch window glass in an atmosphere of a high temperature using an upper mold and a lower mold, in such a manner that the curved surface portion is formed in the first portion having the formed part mounting hole,
   wherein,
      the ceramic ink comprises heat-resistant ink capable of withstanding the high temperature in the curved glass forming process, and
      the predetermined size of the part mounting hole of the plane glass is smaller than a size, measured along a curvature direction of the formed curved touch window glass, of the part mounting hole of the formed curved touch window glass,
   wherein the upper mold, the lower mold, and the weight body come into point contacts or line contacts with the plane glass, and
   wherein the line contacts are made by linear protrusions formed on the upper mold and the lower mold.

2. The method of claim 1, wherein:
   the back surface comprises a printing portion and a non-printing portion;
   the printing portion of the back surface comprises the printed specific pattern;
   the non-printing portion is free of the printed specific pattern in order to mount a lens of an embedded camera thereon; and
   a first size of the non-printing portion of the plane glass is smaller than a second size of the non-printing portion of the formed curved touch window glass, in the curvature direction.

3. The method of claim 1, wherein, in the curved glass forming process, the first portion of the plane glass is formed into the curved surface portion by a weight of a weight body coming into contact with one side of the plane glass in a state in which the plane glass has been supported by the upper mold and the lower mold.

* * * * *